United States Patent Office 3,174,280
Patented Mar. 23, 1965

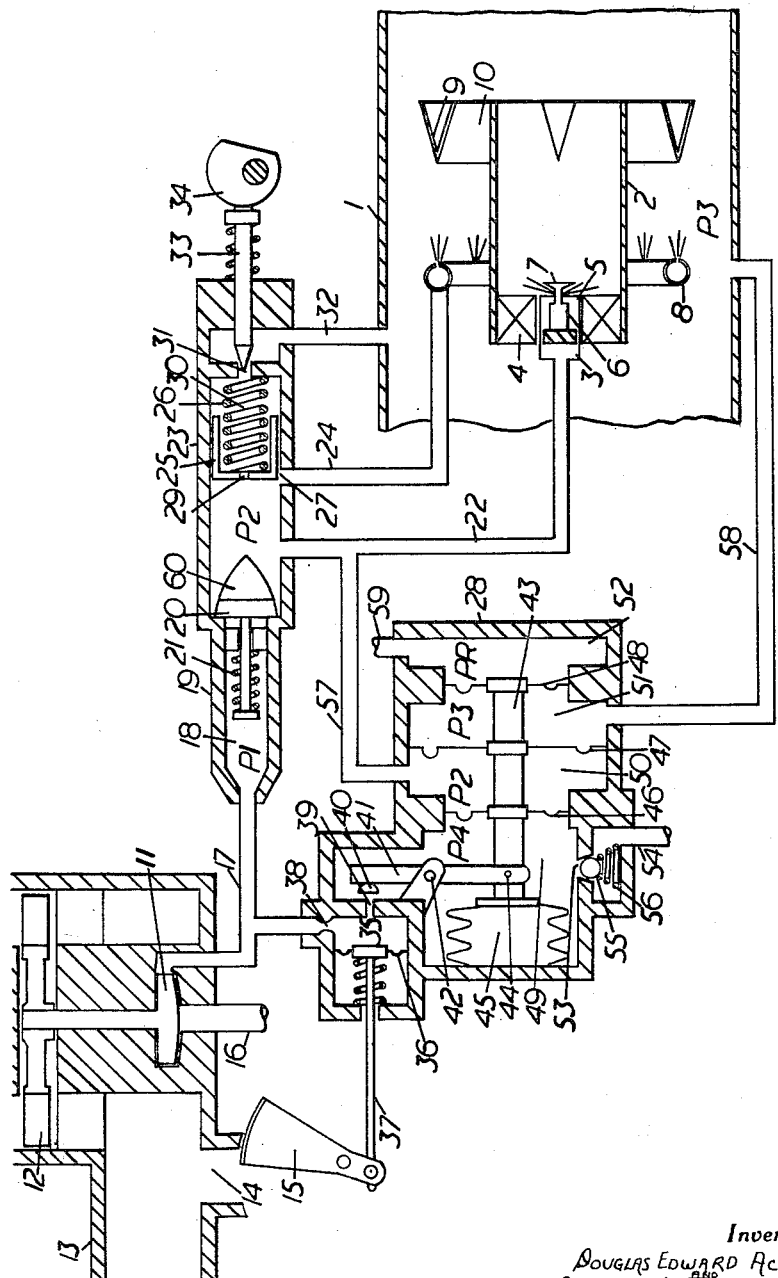

3,174,280
RAMJET POWER PLANTS
Douglas Edward Ackland and Geoffrey Harry Edward Wright, Bristol, England, assignors to Bristol Siddeley Engines Limited, Bristol, England, a British company
Filed Feb. 12, 1963, Ser. No. 258,035
Claims priority, application Great Britain, Feb. 16, 1962, 6,101/62
6 Claims. (Cl. 60—35.6)

The invention relates to ramjet power plants for aerial vehicles intended for launching by boost rocket or equivalent accelerating means and including a ram air turbine coupled to drive a fuel pump having a discharge pipe connected to a fuel injection system in a ramjet engine combustion chamber. The fuel system may also include a spring-loaded check valve between the pump and the injection system so that the fuel pressure between the pump and the check valve is higher than the pressure of fuel delivered to the injection system, the higher pressure being useful for operating servo devices. The check valve may also seal the system against leakage prior to launching.

With power plants of this kind the difficulty may be encountered that the air turbine, owing to its inertia and to that of the fuel pump, and to the relatively low ram pressure at that stage is unable to accelerate to its normal running speed during the comparatively brief period of launching acceleration, with the result that the fuel pressure is inadequate to open the check valve and operate the fuel injection system in a satisfactory manner by the time there is a mass flow of air through the engine which is adequate for starting combustion.

A ramjet power plant according to the present invention has a check valve comprising a valve body fixed in relation to the engine, a spring-loaded closure member openable by fuel pump discharge pressure, and a mass mounted for movement in a fore and aft direction relatively to the engine, the mass being coupled to the closure member or part of the closure member, and so arranged that the force of the mass on the closure member during forward launching acceleration will substantially reduce the opening pressure differential across the check valve as compared with the opening pressure differential during zero forward acceleration. The opening pressure differential is preferably reduced to not more than half of the opening pressure differential during zero forward acceleration.

By this arrangement the fuel pressure needed before combustion can be started becomes available at the injection system sooner than would otherwise be the case with any given ram air turbine and pump and with the same effect from the check valve on the fuel pressure after the boost rocket or the like has stopped providing thrust.

In a preferred arrangement the check valve is disposed with respect to the ramjet engine so that the closure member opens by movement in a rearward direction, and the mass which reduces the opening pressure is part of the closure member itself.

An example of a power plant according to the invention is shown diagrammatically in the accompanying drawing.

The power plant includes a ramjet engine of which the combustion system casing is shown at 1, and it contains a pilot combustion can 2 having, at its upstream end, a fuel injector 3 surrounded by a ring of swirl vanes 4 for admission of combustion air. The fuel injector 3 is of the kind comprising a centrally perforated resilient diaphragm 5 which is moved by fuel pressure away from an obturating member 6 to provide a substantially linear pressure-flow characteristic. The fuel issuing from the perforation strikes a conical anvil 7 and is dispersed into the can 2. The main supply of fuel is dispersed into the casing 1 around the can 2 from a perforated manifold 8 and burns downstream of a flameholder system comprising circular and radial gutters 9, 10 at the downstream open end of the can. Further downstream, but not shown in the drawing, the casing 1 carries a fixed area converegent-divergent propulsion nozzle which is choked in normal operation; that is to say, sonic velocity is reached in the throat of the nozzle.

The fuel supply system for the engine comprises a centrifugal pump 11 driven by an air turbine 12 receiving air from a ram air intake duct 13 having an air spill opening 14 controlled by a chopper type valve member 15. The pump draws liquid fuel through a pipe 16 from a tank (not shown) and discharges it through a discharge pipe 17 at a pressure $P_1$ controllable, in normal flight conditions, by opening and closing movements of the air spill valve 15.

The discharge pipe carries the fuel to a cheek valve 18 comprising a body portion 19 fixed in relation to the engine, and a closure member 20 loaded by a spring 21 so as to be openable by pump discharge pressure. Part of the fuel leaving the cheek valve at pressure $P_2$ is conveyed by a pipe 22 to the pilot fuel injector 3 and most of the remainder proceeds to the perforated manifold 8, constituting the main injection system, by way of a linearising valve 23 and a pipe 24. The linearising valve comprises a piston 25 which is moved by fuel pressure against a spring 26 and against combustion chamber pressure admitted through a pipe 32 and which controls the exposed area of an outlet port 27 to which the pipe 24 is connected. By making the port 27 of suitable shape and the spring of a suitable strength, the flow of fuel through the orifices of the manifold 8 is made substantially directly proportional to the fuel pressure differential on the piston 25 and matched in volume to the mass flow of air through the engine; that is to say, the pressure-flow characteristic of the valve 23 in combination with the manifold 8 is substantially linear and suitable related to the engine requirements. The valve 23 may be provided with a plurality of ports 27 each supplying a separate injection device.

While the power plant is required to operate at full thrust, for example during acceleration to a desired maximum flight Mach number, the differential pressure of fuel acting on the piston 25 is maintained proportional to Rayleigh pressure $P_R$, sensed by a forwardly facing impact pressure probe, by a control device 28. The quantities of fuel flowing through the pilot injector 3 and the manifold 8 are therefore also proportional to Rayleigh pressure, and in known manner this ensures that the fuel/air ratio remains substantially constant. On the maximum flight Mach number being exceeded, the fuel/air ratio in the main part of the combustion chamber is reduced by servo action on the piston 25. For this purpose a small orifice 29 in the piston allows a bleed of fuel into the chamber 30 containing the spring 26, the fuel passing from the chamber into the combustion section of the engine through an orifice 31 and the pipe 32. The orifice 29 is small enough to ensure that the volume of fuel flowing through it is at all times substantially less than the fuel flowing through the pipe 24, so that the fuel/air ratio in the main part of the combustion chamber is not substantially affected. The orifice 31 is controlled by a needle 33 operated by a cam 34 rotated by a Mach meter (not shown). During the full thrust acceleration period the restriction imposed by the orifice 31 and needle 33 is substantially zero, so that the pressure acting on the piston 25 is the difference between combustion chamber pressure $P_3$ and fuel pressure $P_2$ upstream of the piston 25. On the maximum flight Mach number being reached, the cam 34 advances the needle 33 so that escape of fuel from the chamber 30 is restricted, pressure builds up in this chamber and the piston 25 moves to reduce the exposed area of the port 27 and with it the flow of fuel through the manifold 8. The fuel/air ratio in the main part of the combustion chamber is thus reduced, with reduction of engine thrust, but the fuel/air ratio in the pilot can 2 remains unaltered.

The control device 28 includes, for operating the air spill valve 15, a cylinder space 35 bonded in part by a flexible diaphragm 36 connected to the valve 15 by a rod 37. Fuel at pump discharge pressure is admitted into the cylinder through a restricted orifice 38 and escapes through an orifice 39 controlled by a half-ball valve 40 carried by one end of a lever 41 pivoted to the casing at 42 and connected at its other end to a rod 43 by a pin 44. On one side of the pin 44 the rod is connected to the free end of an evacuated capsule 45 and on the other side it is connected to three flexible diaphragms 46, 47 and 48 spaced apart and supported by the casing so as to form four chambers 49, 50, 51 and 52, the first of these containing the evacuated capsule 45 and the lever 41. The diaphragms 46 and 48 have the same effective area as the evacuated capsule 45, while the area of the diaphragm 47 is greater. Fuel entering the chamber 49 through the orifice 39 drains away through an orifice 53 and a pipe 54 to a spill orifice situated in an exterior surface of the engine or vehicle at a low pressure region. A non-return valve 55 with a light spring 56 is provided to prevent leakage of fuel prior to launching, and maintains in the chamber 49 a pressure $P_4$ slightly above atmospheric pressure. The chamber 50 receives fuel at pressure $P_2$ through a pipe 57, while the chambers 51 and 52 are pressurised respectively to combustion chamber pressure $P_3$ through a pipe 58 and to Rayleigh pressure $P_R$ through a pipe 59.

If the areas of the capsule 45 and diaphragms 46 and 48 are represented by $A_1$ and the area of the diaphragm 47 by $A_2$, the static balance condition of the system is given by the equation:

$$P_R A_1 + P_3 A_2 + P_2 A_1 + P_4 A_1 = P_4 A_1 + P_2 A_2 + P_3 A_1$$

whence:

$$P_R A_1 = P_2 A_2 + P_3 A_1 - P_3 A_2 - P_2 A_1$$
$$= (A_2 - A_1)(P_2 - P_3)$$

and $$P_R = \frac{A_2 - A_1}{A_1}(P_2 - P_3)$$

Since $A_1$ and $A_2$ are constants, it will be seen that the fuel pressure $P_2 - P_3$ acting on the piston 25 of the linearising valve 25, and on the diaphragm 5 of the pilot fuel injector 3, is directly proportional to Rayleigh pressure $P_R$, which is the condition required to maintain the fuel/air ratio constant. Should unbalance occur due to increase of Rayleigh pressure (for which a compensating increase in fuel flow must be made) the diaphragm system will move towards the left, as seen in the drawing, so that the half ball valve 39, 40 opens further, pressure in the servo cylinder 35 falls owing to a pressure drop through the orifice 38, and the chopper valve 15 moves to reduce the amount of air spill. The air turbine consequently speeds up and the pump discharge pressure increases until balance is restored. On decrease of Rayleigh pressure the reverse action occurs, that is to say the half ball valve closes further and the servo diaphragm 36 moves to increase the air spillage. To ensure adequate servo pressure in all conditions of flight the check valve 18 has to be fairly heavily loaded, so that it has an opening pressure differential of, say, 30 pounds per square inch.

Prior to launching, the pressure $P_1$ in the pump discharge pipe 17 and in the servo cylinder 35 is atmospheric, and the air spill valve 15 is therefore fully closed, also the half ball valve 39, 40 is fully open since the pressures $P_2$, $P_3$ and $P_R$ are all atmospheric. During the launching acceleration the air spill valve 15 remains closed, the air surbine accelerates, and the pump discharge pressure increases; the fuel injection system cannot however operate sufficiently well for light-up (even though a sufficient mass flow of air is available) until a certain minimum value of the pressure $P_2$ is available downstream of the check valve 18. In accordance with this invention, the period before combustion can be started is reduced by temporarily unloading the check valve to reduce the difference between the fuel pressures $P_1$ and $P_2$. For this purpose the check valve is arranged so that the closure member 20 opens rearwardly and the mass of this member is made sufficient to produce the desired degree of unloading with the forward acceleration available. To achieve this result the closure member 20 is provided with a massive head, a part 60 of which is made of so-called "heavy metal" alloy having a specific gravity of about 16 and an approximate composition by weight of 90% tungsten, 7.5% nickel and 2.5% copper.

The unloading is arranged to reduce the opening pressure differential across the check valve to not more than half the opening pressure differential with zero fore and aft acceleration. In the case, mentioned above, in which under static conditions the check valve has an opening presure differential of 30 pounds per square inch, the mass of the closure member 20 is preferably selected in relation to the launching acceleration to unload the valve to an opening pressure differential of about 10 pounds per square inch. A starting pressure differential of this order is suitable for use with a fuel injection system of the kind described, but other systems might require a higher starting pressure for satisfactory fuel dispersion. The weight should not be sufficient to open the check valve immediately the vehicle is launched since it is undesirable to start supplying fuel until sufficient forward speed has been attained to produce a suitable air pressure in the combustion chamber.

The unloading of the check valve produces two results. Firstly it shortens the acceleration period before starting fuel pressure becomes available at the injection system, and secondly, after this has been achieved, and until the air turbine reaches a speed at which it comes under the control of the control system 28, it reduces the pressure drop across the ceck valve 18 and thus makes a higher fuel pressure available at the injection system.

We claim:

1. A ramjet power plant including a ram air turbine coupled to drive a fuel pump having a discharge pipe connected to a fuel injector system in a ramjet engine combustion chamber, and including in the fuel system a spring-loaded check valve between the pump and the injection system so that the fuel pressure between the pump and the check valve will be higher than the pressure of fuel delivered to the injection system, the check valve comprising a valve body fixed in relation to the engine, a spring-loaded closure member openable by fuel pump discharge pressure, and a mass mounted for movement in a fore and aft direction relatively to the engine, the mass being coupled to at least a part of the closure member in such a way that the inertia of the mass acts on the closure member during forward acceleration to reduce the opening pressure differential across the check valve, and the size of the mass being so related to the strength of the spring of the check valve that during forward launching acceleration fuel begins to flow to the injector system at a substantially lower speed of the pump than is required to maintain flow during zero forward acceleration.

2. A ramjet power plant according to claim 1 including a pipe connection from the pump discharge pipe to a device for controlling the pump discharge pressure in response to the air pressure in the ramjet engine combustion chamber, the spring-loaded check valve being between the pump and the said pipe connection to the control device.

3. A ramjet power plant according to claim 1, in which the closure member of the valve opens by movement with respect to the valve body in a rearward direction, and in which the mass which reduces the opening pressure differential is part of the closure member.

4. A ramjet power plant according to claim 1 in which the mass is capable of reducing the opening pressure differential during forward acceleration to not more than half of the opening pressure differential during zero forward acceleration.

5. A ramjet power plant according to claim 4 in which the closure member of the valve opens by movement with respect to the valve body in a rearward direction, and in which the mass which reduces the opening pressure differential is part of the closure member.

6. A ramjet power plant including a ram air turbine coupled to drive a fuel pump having a discharge pipe connected to a fuel injector system in a ramjet engine combustion chamber, and including in the fuel system a spring-loaded check valve between the pump and the injection system so that the fuel pressure between the pump and the check valve will be higher than the pressure of fuel delivered to the injection system, the check valve comprising a valve body fixed in relation to the engine, a spring-loaded closure member openable by fuel pump discharge pressure, and a mass mounted for movement in a fore and aft direction relatively to the engine, the mass being coupled to at least a part of the closure member, whereby the increased inertia force of the mass acts on the closure member during forward launching acceleration to reduce the opening presure differential across the check valve and hence increase the flow of fuel to the combustion chamber.

References Cited by the Examiner

UNITED STATES PATENTS

| | | | |
|---|---|---|---|
| 2,637,273 | 5/53 | Stokes | 60—39.28 |
| 2,850,871 | 9/58 | Drake | 60—35.6 |
| 2,882,680 | 4/59 | Jamison | 60—39.28 |
| 3,028,731 | 4/62 | Drake | 60—35.6 |
| 3,106,822 | 10/63 | Bragg | 60—39.28 |

SAMUEL LEVINE, *Primary Examiner.*